United States Patent
Kudo et al.

(10) Patent No.: US 7,878,643 B2
(45) Date of Patent: Feb. 1, 2011

(54) AQUEOUS INK, INK JET RECORDING METHOD, INK CARTRIDGE, RECORDING UNIT, AND INK JET RECORDING APPARATUS

(75) Inventors: Satoshi Kudo, Kawasaki (JP); Kenji Moribe, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 12/160,282

(22) PCT Filed: May 7, 2008

(86) PCT No.: PCT/JP2008/058797
§ 371 (c)(1),
(2), (4) Date: Jul. 8, 2008

(87) PCT Pub. No.: WO2008/140089
PCT Pub. Date: Nov. 20, 2008

(65) Prior Publication Data
US 2010/0225707 A1  Sep. 9, 2010

(30) Foreign Application Priority Data
May 11, 2007 (JP) .............................. 2007-126632
Apr. 23, 2008 (JP) .............................. 2008-112759

(51) Int. Cl.
*G01D 11/00* (2006.01)
*B41J 2/01* (2006.01)
*B41J 2/05* (2006.01)

(52) U.S. Cl. .................. 347/100; 347/101; 347/56

(58) Field of Classification Search ............. 347/56, 347/50, 54, 57–59, 61–65, 40, 42, 44, 47, 347/20, 19, 95, 100; 106/101, 105, 106, 106/31.13, 31.27, 31.43, 31.47, 31.58, 31.59
See application file for complete search history.

(56) References Cited

U.S. PATENT DOCUMENTS 4,723,129 A    2/1988  Endo et al. ..................... 347/56

(Continued)

FOREIGN PATENT DOCUMENTS

EP    1 473 340 A1    11/2004

(Continued)

OTHER PUBLICATIONS

International Search Report and Written Opinion in PCT/JP2008/058797, dated Apr. 2007.

(Continued)

*Primary Examiner*—K. Feggins
(74) *Attorney, Agent, or Firm*—Fitzpatrick, Cella, Harper & Scinto

(57) ABSTRACT

An aqueous ink contains at least an aqueous medium, a surfactant, and a dye. The aqueous medium includes only water and at least one water-soluble organic compound(s) and the static surface tension of the aqueous medium is from 45 mN/m or more to 57 mN/m or less. The dynamic surface tension of the aqueous ink satisfies the following conditions: (1) The dynamic surface tension of the aqueous ink at a lifetime of 50 milliseconds is from 42 mN/m or more to less than 49 mN/m; (2) The dynamic surface tension of the aqueous ink at a lifetime of 500 milliseconds is from 28 mN/m or more to 38 mN/m or less; and (3) A difference between the dynamic surface tension of the aqueous ink at a lifetime of 50 milliseconds and the dynamic surface tension of the aqueous ink at a lifetime of 500 milliseconds is 7 mN/m or more.

9 Claims, 7 Drawing Sheets

U.S. PATENT DOCUMENTS

| | | | |
|---|---|---|---|
| 4,740,796 A | 4/1988 | Endo et al. | 47/56 |
| 6,231,652 B1 | 5/2001 | Koyano et al. | 106/31.27 |
| 7,037,362 B2 | 5/2006 | Honma et al. | 106/31.13 |
| 7,141,107 B2 | 11/2006 | Honma et al. | 106/31.58 |
| 7,247,192 B2 | 7/2007 | Ohira et al. | 106/31.27 |
| 2004/0055508 A1* | 3/2004 | Miyamoto et al. | 106/31.47 |
| 2004/0069183 A1 | 4/2004 | Kamoto et al. | 106/31.27 |
| 2004/0080594 A1 | 4/2004 | Ohira et al. | 347/100 |
| 2004/0103815 A1 | 6/2004 | Honma et al. | 106/31.13 |
| 2005/0178290 A1 | 8/2005 | Honma et al. | 106/31.58 |
| 2006/0164483 A1* | 7/2006 | Yabuki et al. | 347/100 |
| 2006/0192828 A1 | 8/2006 | Ohira et al. | 347/100 |
| 2006/0238590 A1 | 10/2006 | Koga et al. | 347/100 |
| 2006/0268086 A1* | 11/2006 | Kawakami et al. | 347/100 |
| 2007/0120920 A1* | 5/2007 | Taguchi et al. | 347/100 |

FOREIGN PATENT DOCUMENTS

| | | |
|---|---|---|
| EP | 1 693 425 A1 | 8/2006 |
| JP | 63-213581 A | 9/1988 |
| JP | 9-296139 | 11/1997 |
| JP | 2002-174713 | 6/2002 |
| JP | 2003-231838 | 8/2003 |
| JP | 2003-238851 | 8/2003 |
| JP | 2004-83621 | 3/2004 |
| JP | 2004-107480 | 4/2004 |
| JP | 2004-115708 | 4/2004 |
| JP | 2006-299127 | 11/2006 |
| WO | WO 03/066758 A1 | 8/2003 |
| WO | WO 2005/054382 A1 | 6/2005 |

OTHER PUBLICATIONS

Nov. 26, 2009 International Preliminary Report on Patentability and Jun. 17, 2008 Written Opinion in International Application No. PCT/JP2008/058797.

* cited by examiner

AQUEOUS INK, INK JET RECORDING METHOD, INK CARTRIDGE, RECORDING UNIT, AND INK JET RECORDING APPARATUS

TECHNICAL FIELD

The present invention relates to an aqueous ink, an ink jet recording method, an ink cartridge, a recording unit, and an ink jet recording apparatus using such an aqueous ink.

BACKGROUND ART

Recently, it is desired to improve image quality in an image that is formed on a recording medium, particularly plain paper, by an ink jet recording method, specifically, the gradation of the image, and color uniformity. For example, the gradation can be improved by decreasing area per one dot formed by the ink on the recording medium. On the contrary, if the area per dot is large, a plurality of dots are easily connected, so that the area of a surface of the recording medium that is covered by the ink may not be precisely controlled even if the amount of the applied ink per unit area is increased or decreased. Also, since the plurality of dots is easily connected, the blur of the ink on the recording medium may easily occur.

For such problems, it is proposed to suppress the blur of the ink on the recording medium by increasing the static surface tension (so-called "surface tension") of the ink. For example, it is proposed to suppress blur by setting the surface tension of the ink at 20° C. to 45 mN/m or more (see Japanese Patent Application Laid-Open No. S63-213581). Also, it is proposed to suppress blur by setting the surface tension of the ink to 40 mN/m or more (see Japanese Patent Application Laid-Open No. 2004-83621).

Also, as technology for controlling the blur of the ink on the recording medium, the permeation of the ink into the recording medium, and the like, proposition focusing on the dynamic surface tension of the ink is made. For example, it is proposed to suppress blur by setting surface tension at bubble period T (seconds/bubble)≦0.2 to 40 mN/m or more, and to improve ejection reliability by setting surface tension at bubble period T (seconds/bubble)>1 to less than 50 mN/m (see Japanese Patent Application Laid-Open No. H09-296139).

Also, it is proposed to improve ejection reliability and define the dynamic surface tension property at specific lifetime by setting the dry viscosity of the ink to 100 mPa·s or less (see Japanese Patent Application Laid-Open No. 2003-231838). Specifically, it is described that blur is suppressed by setting dynamic surface tension at a lifetime of 10 milliseconds to 45 mN/m or more and that the quick-drying property is improved by setting dynamic surface tension at a lifetime of 1000 ms to 35 mN/m or less.

DISCLOSURE OF THE INVENTION

However, by simply increasing the static surface tension of the ink as in the inventions described in Japanese Patent Application Laid-Open No. S63-213581 and Japanese Patent Application Laid-Open No. 2004-83621 mentioned above, blur may not be suppressed, and a surface of the recording medium cannot be uniformly wetted, so that the color uniformity in the image may decrease. If the static surface tension of the ink is increased, the permeability of the ink into the recording medium decreases, so that the time until the permeation of the ink into the recording medium is finished is long, therefore, ink transfer and the like may occur.

In the inventions described in Japanese Patent Application Laid-Open No. H09-296139 and Japanese Patent Application Laid-Open No. 2003-231838 mentioned above, a change in the dynamic surface tension of the ink is focused on, and an attempt to control blur and permeation is made. However, as a result of the examination of the present inventors, with the definition of dynamic surface tension described in Patent Documents 3 and 4, the gradation could not be improved while maintaining the color uniformity in the image, when plain paper was used as the recording medium. This is presumed to be caused by what state change occurs in the ink on the recording medium being not considered in the inventions described in Patent Documents 3 and 4. In other words, in the inventions described in Patent Documents 3 and 4, a phenomenon occurring on the recording medium is not considered, so that only with the definition of ink properties in these documents, the gradation cannot be improved while maintaining the color uniformity in the image.

Therefore, it is an object of the present invention to provide an aqueous ink with which an image having excellent gradation and color uniformity can be obtained. It is another object of the present invention to provide an ink jet recording method using the aqueous ink, an ink cartridge, a recording unit, and an ink jet recording apparatus.

The above objects are achieved by the present invention below. In other words, an aqueous ink according to the present invention contains at least an aqueous medium, a surfactant, and a dye, characterized in that the aqueous medium comprises only water and at least one water-soluble organic compound(s), that the static surface tension of the aqueous medium is from 45 mN/m or more to 57 mN/m or less, and that the dynamic surface tension of the aqueous ink satisfies the following conditions (1), (2), and (3):

(1) The dynamic surface tension of the aqueous ink at a lifetime of 50 milliseconds is from 42 mN/m or more to less than 49 mN/m.

(2) The dynamic surface tension of the aqueous ink at a lifetime of 500 milliseconds is from 28 mN/m or more to 38 mN/m or less.

(3) A difference between the dynamic surface tension of the aqueous ink at a lifetime of 50 milliseconds and the dynamic surface tension of the aqueous ink at a lifetime of 500 milliseconds is 7 mN/m or more.

An ink jet recording method according to another embodiment of the present invention, in which an ink is ejected by an ink jet method, is characterized in that the ink is the above aqueous ink.

An ink cartridge according to another embodiment of the present invention, comprising an ink storage portion for storing an ink, is characterized in that the ink stored in the ink storage portion is the above aqueous ink.

A recording unit according to another embodiment of the present invention, comprising an ink storage portion for storing an ink, and a recording head for ejecting an ink, is characterized in that the ink stored in the ink storage portion is the above aqueous ink.

An ink jet recording apparatus according to another embodiment of the present invention, comprising an ink storage portion for storing an ink, and a recording head for ejecting an ink, is characterized in that the ink stored in the ink storage portion is the above aqueous ink.

According to the present invention, an aqueous ink, with which an image having excellent gradation and color uniformity can be obtained, can be provided. According to another embodiment of the present invention, an ink jet recording method, an ink cartridge, a recording unit, and an ink jet recording apparatus using such an aqueous ink can be provided.

Further features of the present invention will become apparent from the following description of exemplary embodiments with reference to the attached drawings.

BEST MODES FOR CARRYING OUT THE INVENTION

Figure 1:
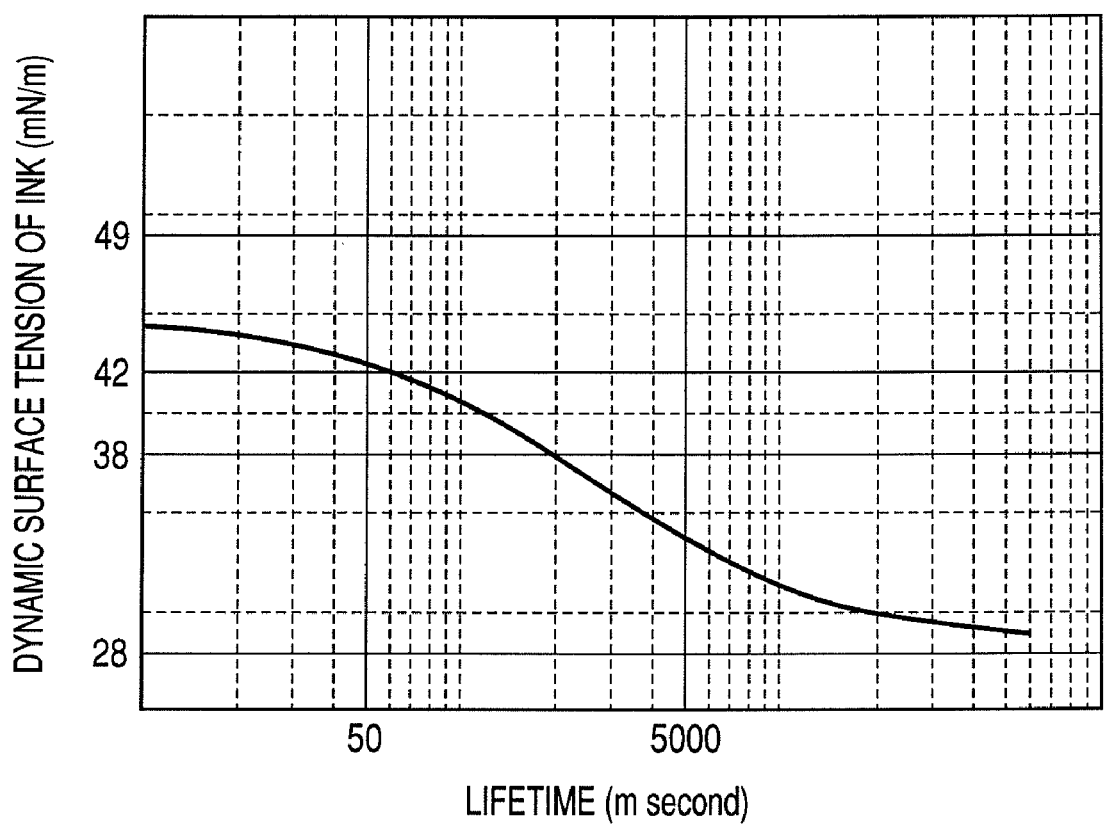
FIG. 1 is a graph typically illustrating one example of a change in the dynamic surface tension of an ink.

The present invention will be further described below in detail by way of best mode for carrying out the invention. In the following description, an aqueous ink is sometimes called "ink".

First, a maximum bubble pressure method used for the measurement of dynamic surface tension in the present invention is described. The maximum bubble pressure method is a method in which maximum pressure that is necessary for releasing a bubble formed in a tip portion of a probe (capillary) dipped in a liquid to be measured is measured to obtain dynamic surface tension from this maximum pressure. Lifetime (surface age) is time, in forming a bubble in the tip portion of the probe in the maximum bubble pressure method, from a point of time at which a surface of a new bubble is formed after a bubble separates from the tip portion to a time at the maximum bubble pressure (a point of time at which the radius of curvature of the bubble and the radius of the probe tip portion is equal). The dynamic surface tension in the present invention is a value measured at 25° C.

A first technical idea of the present invention lies in that the static surface tension of the aqueous medium (the detail will be described later) in the ink is in a particular range to suppress a feathering phenomenon (a phenomenon in which the ink blurs along the fibers of the recording medium) that occurs immediately after the ink is applied to the recording medium. In addition to the above, the first technical idea lies in that the dynamic surface tension of the ink at a lifetime of 50 milliseconds is a certain value or more to suppress the spread of the ink on the recording medium. Further, in addition to the above, the first technical idea lies in that the dynamic surface tension of the ink is sharply decreased between a lifetime of 50 milliseconds and a lifetime of 500 milliseconds to allow the ink to permeate the recording medium rapidly, with the spread of the ink on the recording medium suppressed. By making one ink simultaneously have these properties, the area per one dot formed by the ink can be uniform and smaller compared with dots formed by a conventional ink, so that the gradation on the recording medium can be improved.

A second technical idea of the present invention lies in that the dynamic surface tension of the ink at a lifetime of 500 milliseconds is a certain value or less to improve color uniformity of the image.

The present inventors examined the behavior of the evaporation of the ink and the permeation of the ink into the recording medium to find that the following is necessary to make area per dot on the recording medium uniform and small to improve gradation.

A state immediately after an ink is applied on a recording medium (for example, plain paper) is considered. At this time, since this time is immediately after a new gas-liquid interface is formed, the lifetime can be assumed to be closer and closer to 0 second, and the orientation of the surfactant to the gas-liquid interface can be negligible. Therefore, the dynamic surface tension of the ink in this state can approach and be equal to the static surface tension of the aqueous medium (a mixed solvent including only water and at least one water-soluble organic compound(s)) in the ink. "The aqueous medium in the ink" in the present invention means an aqueous medium excluding the coloring material and surfactant in the ink, that is, a mixed solvent including only water and at least one water-soluble organic compound(s).

A portion having high surface energy and a portion having low surface energy exist on the recording medium near a portion where the ink is applied. Therefore, if the static surface tension of the aqueous medium is too high, the ink selectively easily flows toward the portion having high surface energy and being easily wettable by the ink, which exists near the portion where the ink is applied. In this way, a feathering phenomenon occurs, resulting in large variations in area per one dot formed by the ink. On the contrary, if the static surface tension of the aqueous medium is too low, the surface tension of the portion where the ink is applied is lower than that near the portion where the ink is applied. As a result, the spread of the ink occurs rapidly, so that the gradation decreases.

The present inventors examined such problems to find that the following is necessary. It is necessary to suppress the occurrence of a feathering phenomenon by providing such a state that ink wetting occurs uniformly, near the portion on the recording medium where the ink is applied. It is necessary to decrease area per one dot formed by the ink and variations by suppressing rapid spread of the ink. Then, the present inventors examined to find that by setting the static surface tension of the aqueous medium in the ink in a particular range, the occurrence of a feathering phenomenon can be suppressed, and the area per one dot formed by the ink and variations can be decreased. Specifically, the knowledge that the static surface tension of the aqueous medium in the ink should be from 45 mN/m or more to 57 mN/m or less was obtained. As described above, if the surface tension of the aqueous medium is less than 45 mN/m, the gradation of the image may decrease. At more than 57 mN/m, feathering and variations in dot diameter may occur.

For a state in which the ink spreads on the recording medium, the present inventors examined as follows. First, various inks having different properties of dynamic surface tension change with lifetime were prepared, and using these inks respectively, one-dot ruled line was recorded on recording media, such as various types of plain paper. Then, the relationship between the line width of the ruled line and the dynamic surface tension and static surface tension of the ink at a lifetime of 10 milliseconds to a lifetime of 5000 milliseconds was examined. As a result, it was found that the correlation between the line width of the ruled line and the dynamic surface tension of the ink at a lifetime of 50 milliseconds was largest in all types of the recording media examined. Also, it was found that as the lifetime increases or decreases from a lifetime of 50 milliseconds, this correlation decreases continuously. From this, the present inventors obtained the knowledge that by examining the dynamic surface tension of the ink at a lifetime of 50 milliseconds, the line width of the ruled line, that is, the state in which the ink spreads on the recording medium can be defined. In the above examination, the line width of the ruled line was measured after recording and then leaving the recorded matter overnight.

From this, the present inventors paid attention to the property of the dynamic surface tension of the ink at a lifetime of 50 milliseconds and further examined. Specifically, inks with dynamic surface tension at a lifetime of 50 milliseconds changed variously were prepared, and images were formed using these inks respectively. The relationship between the gradation in the obtained image and the dynamic surface tension of the ink at a lifetime of 50 milliseconds was examined. As a result, the knowledge that excessive spread of the ink on the recording medium can be suppressed when the dynamic surface tension of the ink at a lifetime of 50 milliseconds is 42 mN/m or more was obtained.

The present inventors consider reasons for high correlation between the state in which the ink spreads on the recording medium and the dynamic surface tension at a lifetime of 50 milliseconds as follows: At a point of 50 milliseconds after the ink is applied to the recording medium, at least part of the ink permeates a region near a surface of the recording medium, and this region is considered as one important factor that determines the area of one dot formed by the ink on the recording medium. The contact angle between the ink and the recording medium is changed by a change in the value of the dynamic surface tension of the ink after the ink is applied to the recording medium. This is also considered as a factor that determines the area of one dot formed by the ink on the recording medium. Further, in the ink immediately after being applied on the recording medium, the evaporation of water and the like in the ink occurs to a large degree, compared with the ink permeating in the direction of the thickness of the recording medium. It is considered that the amount the ink permeating in the direction of the thickness of the recording medium also depends on dynamic surface tension of the ink at a lifetime of 50 milliseconds. This is also considered as one important factor that determines the area of one dot formed by the ink on the recording medium.

However, if the ink continues to maintain high surface tension for long time, the permeation of the ink in the thickness direction of the recording medium does not proceed. As a result, the ink spreads on a surface of the recording medium, so that the gradation may decrease. The present inventors examined to obtain the knowledge that the following should be done to suppress a decrease in gradation. First, the dynamic surface tension of the ink at a lifetime of 50 milliseconds is increased to suppress excessive spread of the ink on the recording medium. Then, the dynamic surface tension of the ink is sharply decreased to facilitate the permeation of the ink in the thickness direction of the recording medium to further suppress the spread of the ink on a surface of the recording medium. In this way, the area per one dot formed by the ink on the recording medium can be appropriate. As a result of the examination of the present inventors, it was found that to cause such a phenomenon, specifically, the dynamic surface tension of the ink should be decreased by 7 or more between a lifetime of 50 milliseconds and 500 milliseconds.

When a plain paper or the like is used as the recording medium, it is necessary that the dye in the ink is uniformly fixed to the recording medium to improve color uniformity. The uniformly fixed state refers to a state in which the dye in the ink uniformly dyes fibers constituting the recording medium, rather than a state in which the dye in the ink is taken in relatively large voids present in the plain paper or the like, which is a recording medium, and is localized. It is necessary that the ink wets pores, such as voids between the fibers, to fix the dye in the ink uniformly. The present inventors examined properties necessary for the ink to have wettability for the pores to find that it is necessary to determine the dynamic surface tension of the ink at a lifetime of 500 milliseconds suitably. Specifically, it was found that it is necessary that the dynamic surface tension of the ink at a lifetime of 500 milliseconds is 38 mN/m or less.

In other words, the present inventors obtained the knowledge that it is necessary that the ink has a dynamic surface tension property described below and that the aqueous medium in the ink has a static surface tension property described below to both improve color uniformity and improve gradation. In other words, it is necessary that the dynamic surface tension of the ink has the following three properties: (A) The dynamic surface tension of the ink at a lifetime of 50 milliseconds is 42 mN/m or more. (B) A difference in the dynamic surface tension of the ink between at a lifetime of 50 milliseconds and a lifetime of 500 milliseconds is 7 mN/m or more. (C) It is necessary that the dynamic surface tension at a lifetime of 500 milliseconds is 38 mN/m or less. It is necessary that the static surface tension of the aqueous medium in the ink is from 45 mN/m or more to 57 mN/m or less.

If the dynamic surface tension of the ink at a lifetime of 50 milliseconds is 49 mN/m or more, the spread of the ink on a surface of the recording medium precedes the permeation of the ink in the thickness direction of the recording medium, even if the degree of a subsequent decrease in dynamic surface tension is large. Therefore, the area per dot is large, so that gradation may not be obtained. Therefore, it is necessary that the dynamic surface tension of the ink at a lifetime of 50 milliseconds is from 42 mN/m or more to less than 49 mN/m.

If the dynamic surface tension of the ink at a lifetime of 500 milliseconds is too low, specifically less than 28 mN/m, the permeation of the ink into the recording medium precedes permeation into the voids between the fibers. As a result, the ink easily permeates inside the recording medium (the direction of the thickness of the recording medium), so that the ink may strike to the back surface of the recording medium, that is, strike-through may occur. Therefore, it is necessary that the dynamic surface tension of the ink at a lifetime of 500 milliseconds is from 28 mN/m or more to 38 mN/m or less. In the present invention, further, the dynamic surface tension of the ink at a lifetime of 500 milliseconds can be particularly from 32 mN/m or more to 38 mN/m or less.

A difference in dynamic surface tension of the ink between at a lifetime of 50 milliseconds and 500 milliseconds can be large, from the viewpoint of facilitating the permeation of the ink into the recording medium after a region where the ink permeates the recording medium at a lifetime of 50 milliseconds is determined to some degree. However, as described above, it is necessary that the dynamic surface tension of the ink at a lifetime of 500 milliseconds is 28 mN/m or more. Therefore, a difference in dynamic surface tension of the ink between at a lifetime of 50 milliseconds and a lifetime of 500 milliseconds can be (the value of dynamic surface tension at a lifetime of 50 milliseconds (mN/m)−28 (mN/m)) or less. Further, a difference in dynamic surface tension of the ink between at a lifetime of 50 milliseconds and a lifetime of 500 milliseconds can be less than 21 mN/m.

In summarizing the above, it is necessary that the ink of the present invention satisfies the following conditions (1) to (3) and that the static surface tension of the aqueous medium including only water and at least one water-soluble organic compound(s) in the ink is from 45 mN/m or more to 57 mN/m or less. (1) The dynamic surface tension of the ink at a lifetime of 50 milliseconds is from 42 mN/m or more to less than 49 mN/m. (2) The dynamic surface tension of the ink at a lifetime of 500 milliseconds is from 28 mN/m or more to 38 mN/m or less. (3) A difference between the dynamic surface tension of the ink at a lifetime of 50 milliseconds and the dynamic surface tension of the ink at a lifetime of 500 milliseconds is 7 mN/m or more. FIG. 1 is a graph typically illustrating one example of a change in the dynamic surface tension of the ink that satisfies the conditions defined in the present invention.

<Ink>

It is necessary that the ink according to the present invention has the dynamic surface tension property as described above and that the aqueous medium in the ink has the static surface tension property as described above. Except for this, configuration similar to that of a conventional ink may be provided. Each component constituting the ink of the present invention will be described below.

(Surfactant)

The ink of the present invention can contain a surfactant as a penetrant. It is necessary that the formulated ink is adjusted to have the dynamic surface tension property described above. As such a surfactant, for example, the following can be used. For the surfactants mentioned below, one, or two or more in combination can be used.

(Nonionic Surfactant)

Polyoxyethylene alkyl ether, polyoxyethylene fatty acid ester, polyoxyethylene alkyl phenyl ether, polyoxyethylene·polyoxypropylene block copolymers, and the like. Fatty acid diethanolamide, acetylene glycol ethylene oxide adducts, acetylene glycol surfactants, and the like.

(Anionic Surfactant)

Polyoxyethylene alkyl ether sulfate, polyoxyethylene alkyl ether sulfonate, polyoxyethylene alkyl phenyl ether sulfate, polyoxyethylene alkyl phenyl ether sulfonate, and the like. Alpha sulfo fatty acid ester salt, alkyl benzene sulfonate, alkyl phenol sulfonate, alkyl naphthalin sulfonate, alkyl tetralin sulfonate, dialkyl sulfosuccinate, and the like.

(Cationic Surfactant)

Alkyl trimethyl ammonium salt, dialkyl dimethyl ammonium chloride, and the like.

(Amphoteric Surfactant)

Alkyl carboxy betaine and the like.

It is necessary that the ink of the present invention is adjusted to have the dynamic surface tension property described above. The ink can have the dynamic surface tension property described above by adjusting the dynamic surface tension of the ink, using one or two or more of the surfactants mentioned above.

In the present invention, particularly, the dynamic surface tension of the ink can be particularly adjusted using a nonionic surfactant, and more suitably polyoxyethylene alkyl ether, among the above surfactants.

In the present invention, the polyoxyethylene alkyl ether can be particularly at least one selected from a surfactant expressed by the following general formula (1) and a surfactant expressed by general formula (2). Inks containing these surfactants have a large change in dynamic surface tension with respect to a change in lifetime, so that the inks are particularly suitable for providing both gradation and color uniformity.

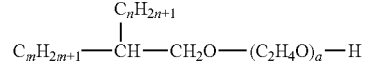

$$C_mH_{2m+1}\!-\!\overset{\displaystyle C_nH_{2n+1}}{\underset{\displaystyle |}{CH}}\!-\!CH_2O\!-\!(C_2H_4O)_a\!-\!H \qquad \text{General formula (1)}$$

(in general formula (1), m, n, and a each independently represent an integer of 1 or more, and m+n represents an integer of 14 to 20.)

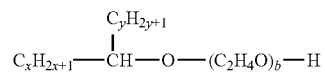

$$C_xH_{2x+1}\!-\!\overset{\displaystyle C_yH_{2y+1}}{\underset{\displaystyle |}{CH}}\!-\!O\!-\!(C_2H_4O)_b\!-\!H \qquad \text{General formula (2)}$$

(in general formula (2), x, y, and b each independently represent an integer of 1 or more, and x+y represents an integer of 12 to 21.)

The content (% by mass) of the surfactant in the aqueous ink can be from 0.30% by mass or more to 2.0% by mass or less, and further from 0.75% by mass or more to 1.5% by mass or less, based on the total mass of the aqueous ink. If the content is less than 0.30% by mass, the wetting of the recording medium by the ink is not sufficiently obtained, so that the color uniformity may decrease. If the content is more than 2.0% by mass, the content of the surfactant becomes too high when the water and the like in the ink evaporate near the ejection ports of the recording head, so that the viscosity of the ink locally becomes high, therefore, the ejection stability of the ink may decrease. By setting the content of the surfactant in the ink in the above range, both excellent ejection stability as well as excellent gradation and color uniformity in the image can be provided. Further, in order to obtain excellent color uniformity when plain paper or the like is used as the recording medium, the lower limit of the content of the surfactant in the ink (% by mass) can be 10.0 or more times the critical micelle concentration (in % by mass) of the surfactant used. If the content of the surfactant is less than 10.0 times the critical micelle concentration, the wetting of the recording medium by the ink is not sufficiently obtained, so that color uniformity may not be sufficiently obtained. On the other hand, if the content of the surfactant is 10.0 or more times the critical micelle concentration, a difference in interfacial tension between the ink and the recording medium further decreases when plain paper or the like is particularly used as the recording medium, so that the wetting of the recording medium by the ink is sufficiently obtained. As a result, the color uniformity is particularly excellent.

Further, in the present invention, the HLB value of the above surfactant by the Griffin method can be particularly from 12.0 or more to 16.5 or less. The Griffin method is a method in which the HLB value is calculated, based on the formula weight of the hydrophilic group of the surfactant and the molecular weight of the surfactant, using the following formula (1):

$$HLB = 20\times(\text{the formula weight of the hydrophilic group of the surfactant})/(\text{the molecular weight of the surfactant}) \qquad (1)$$

If the HLB value is less than 12.0, the hydrophilicity of the surfactant is too low, so that a state in which the surfactant is dissolved in the ink may not be maintained in cases, such as when the ink is stored. On the other hand, if the HLB value is larger than 16.5, the hydrophilicity of the surfactant is too high, so that it may be difficult to decrease dynamic surface tension at a lifetime of 500 milliseconds.

(Aqueous Medium)

It is necessary that the ink of the present invention contains an aqueous medium including water and a water-soluble organic compound. If the ink of the present invention is adjusted to have the static surface tension property of the aqueous medium described above, and is adjusted to have the dynamic surface tension property of the ink described above, any water-soluble organic compound can be used. The content (% by mass) of the water-soluble organic compound in the ink can be from 1.0% by mass or more to 50.0% by mass or less, and further from 3.0% by mass or more to 40.0% by mass or less, based on the total mass of the ink.

As the water-soluble organic compound, specifically, for example, the following can be used.

Alcohols having 1 to 6 carbon atoms, such as ethanol, isopropanol, 2-propanol, n-butanol, isobutanol, pentanol, and hexanol. Carboxylic acid amides, such as N,N-dimethylformamide and N,N-dimethylacetamide. Ketones or keto alcohols, such as acetone, methyl ethyl ketone, and 2-methyl-2-hydroxypentane-4-one. Cyclic ethers, such as tetrahydrofuran and dioxane. Alkylene glycols, such as ethylene glycol, diethylene glycol, triethylene glycol, tetraethylene glycol, 1,2- or 1,3-propylene glycol, 1,2- or 1,4-butylene glycol, and polyethylene glycol. Polyalcohols, such as glycerin, 1,3-butanediol, 1,2- or 1,5-pentanediol, 1,2- or 1,6-hexanediol, 2-methyl-1,3-propanediol, and 1,2,6-hexanetriol. Alkyl ethers of polyalcohol, such as ethylene glycol monomethyl (or -ethyl)ether, diethylene glycol monomethyl (or -ethyl)ether, and triethylene glycol monoethyl (or -butyl) ether. Heterocycles, such as 2-pyrrolidone, N-methyl-2-pyrrolidone, 1,3-dimethyl-2-imidazolidinone, and N-methyl-morpholine. Sulfur-containing compounds, such as dimethyl sulfoxide and thiodiglycol.

The ink of the present invention can have the dynamic surface tension property of the ink described above also by adjusting the dynamic surface tension of the ink, using one or two or more of the water-soluble organic compounds mentioned above. The ink of the present invention can have the static surface tension property of the aqueous medium in the ink described above by adjusting the static surface tension of the aqueous medium, using one or two or more of the water-soluble organic compounds mentioned above.

Water-soluble organic compounds having high permeability, among the above, can be particularly used to adjust the static surface tension of the aqueous medium. Specifically, alcohols, such as ethanol, 2-propanol, 1,2-pentanediol, 1,5-pentanediol, 1,2-hexanediol, and 1,6-hexanediol, can be particularly be used.

As water, deionized water (ion-exchange water) can be used. The content (% by mass) of the water in the ink can be from 30.0% by mass or more to 90.0% by mass or less, based on the total mass of the ink, to provide the ink which has suitable viscosity to eject the ink stably, and with which clogging at the nozzle tip is suppressed.

The type and content of the water-soluble organic compound constituting the aqueous medium contained in an ink having unknown composition can be analyzed by gas chromatography (GC/MS) or the like. Specifically, for example, a sample obtained by fractionating 1 g of an ink having unknown composition and diluting the ink with methanol to a predetermined rate is analyzed using GC/MS (trade name: TRACE DSQ, manufactured by ThermoQuest). Thereby, the type and content of the water-soluble organic compound contained in the aqueous medium can be identified. The content of the water contained in an ink having unknown composition can be identified by a Karl Fischer moisture meter or the like according to a normal method. From the type and content of the water-soluble organic compound constituting the aqueous medium and the content of water thus obtained, an aqueous medium having similar composition is prepared. Then, the static surface tension of the obtained aqueous medium is measured in an environment of a temperature of 25° C. and a humidity of 50%. The static surface tension can be measured, for example, using an automatic surface tensiometer (CBVP-Z type, manufactured by Kyowa Interface Science), by a plate method using a platinum plate. The present invention is not limited to the measurement methods, measurement apparatuses, and the like mentioned above, and any method can be used.

(Dye)

The coloring material used in the ink of the present invention is a dye. The content (% by mass) of the dye in the ink can be from 0.1% by mass or more to 15.0% by mass or less, and further from 1.0% by mass or more to 10.0% by mass or less, based on the total mass of the ink.

The dye is not particularly limited, as long as the dye can be used as the coloring material of a general ink for ink jet. For example, any of a direct dye, an acid dye, a reactive dye, and a basic dye can be used. When the dyes that can be used in the present invention are shown below by color by color index number and general formula, for example, the following is mentioned. A dye that is not described in color index can be used if the dye has water solubility.

[Yellow Coloring Material]

C. I. Direct Yellow: 8, 11, 12, 27, 28, 33, 39, 44, 50, 58, 85, 86, 87, 88, 89, 98, 100, 110, 132, 173, and the like. C. I. Acid Yellow: 1, 3, 7, 11, 17, 23, 25, 29, 36, 38, 40, 42, 44, 76, 98, 99, and the like. Compounds expressed by the following general formula (3) or their salts.

General formula (3)

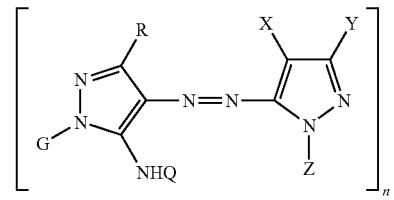

(in general formula (3), G is a heterocycle. n is an integer of 1 to 3. When n is 1, R, X, Y, Z, Q, and G are monovalent groups. Alternatively, when n is 2, R, X, Y, Z, Q, and G are monovalent or divalent substituents, and among these, at least one is a divalent substituent. Alternatively, when n is 3, R, X, Y, Z, Q, and G are monovalent, divalent, or trivalent substituents, and among these, at least two are divalent substituents, or at least one is a trivalent substituent.)

[Magenta Coloring Material]

C. I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like. C. I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like. C. I. Food Red: 87, 92, 94, and the like. C. I. Direct Violet: 107 and the like. Other anthrapyridone compounds. Other xanthene compounds. Compounds expressed by the following general formula (4) or their salts.

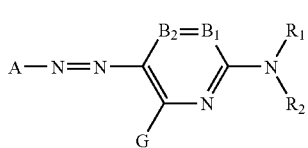

General formula (4)

(in general formula (4), A is a five-membered heterocyclic ring. Each of $B_1$ and $B_2$ is independently one of =$CR_3$— and —$CR_4$=, or any one of $B_1$ and $B_2$ is a nitrogen atom, and the other is one of =$CR_3$— and —$CR_4$=. Each of $R_1$ and $R_2$ is independently one of a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, and a sulfamoyl group. The hydrogen atoms of these groups may be substituted. Each of G, $R_3$, and $R_4$ is independently one of a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, and a sulfonic acid group. The hydrogen atoms of these groups may be substituted. $R_3$ and $R_1$, or $R_1$ and $R_2$ may be bonded to form a five-membered ring or a six-membered ring.)

[Cyan Coloring Material]

C. I. Direct Blue: 1, 15, 22, 25, 41, 76, 77, 80, 86, 90, 98, 106, 108, 120, 158, 163, 168, 199, 226, 307, and the like. C. I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and the like. Compounds expressed by the following general formula (5) or their salts.

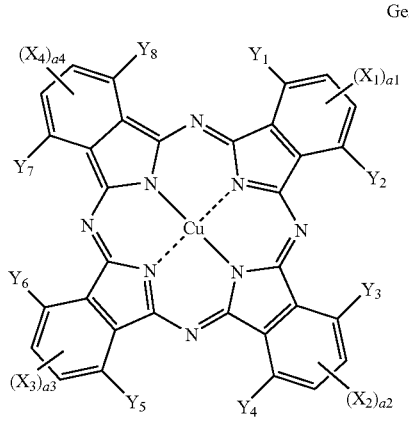

General formula (5)

(in general formula (5), each of $X_1$, $X_2$, $X_3$, and $X_4$ is independently one of —SO—Z, —$SO_2$—Z, —$SO_2NR_1R_2$, a sulfonic acid group, —$CONR_1R_2$, and —$CO_2R_1$. Each of Z is independently one of a substituted or unsubstituted alkyl group, a substituted or unsubstituted cycloalkyl group, a substituted or unsubstituted alkenyl group, a substituted or unsubstituted aralkyl group, a substituted or unsubstituted aryl group, and a substituted or unsubstituted heterocyclic group. Each of $R_1$ and $R_2$ is independently one of a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, and a substituted or unsubstituted heterocyclic group. Each of $Y_1$, $Y_2$, $Y_3$, $Y_4$, $Y_5$, $Y_6$, $Y_7$, and $Y_8$ is independently one of a hydrogen atom, a halogen atom, a substituted or unsubstituted alkyl group, a substituted or unsubstituted aryl group, a cyano group, a substituted or unsubstituted alkoxy group, an amide group, an ureido group, a sulfonamide group, a substituted or unsubstituted carbamoyl group, a substituted or unsubstituted sulfamoyl group, a substituted or unsubstituted alkoxycarbonyl group, a carboxyl group, and a sulfonic acid group. $a_1$, $a_2$, $a_3$, and $a_4$ indicate the number of the substituents of $X_1$, $X_2$, $X_3$, and $X_4$ respectively, and each is independently an integer of 1 or 2.)

[Orange Coloring Material]

C. I. Acid Orange: 7, 8, 10, 12, 24, 33, 56, 67, 74, 88, 94, 116, 142, and the like. C. I. Acid Red: 111, 114, 266, 374, and the like. C. I. Direct Orange: 26, 29, 34, 39, 57, 102, 118, and the like C. I. Direct Red: 84 and the like. C. I. Food Orange: 3 and the like. C. I. Reactive Orange: 1, 4, 5, 7, 12, 13, 14, 15, 16, 20, 29, 30, 84, 107, and the like. C. I. Disperse Orange: 1, 3, 11, 13, 20, 25, 29, 30, 31, 32, 47, 55, 56, and the like.

[Green Coloring Material]

C. I. Acid Green: 1, 3, 5, 6, 9, 12, 15, 16, 19, 21, 25, 28, 81, 84, and the like. C. I. Direct Green: 26, 59, 67, and the like. C. I. Food Green: 3 and the like. C. I. Reactive Green: 5, 6, 12, 19, 21, and the like. C. I. Disperse Green: 6, 9, and the like.

[Blue Coloring Material]

C. I. Acid Blue: 62, 80, 83, 90, 104, 112, 113, 142, 203, 204, 221, 244, and the like. C. I. Reactive Blue: 49 and the like. C. I. Acid Violet: 17, 19, 48, 49, 54, 129, and the like. C. I. Direct Violet: 9, 35, 47, 51, 66, 93, 95, 99, and the like. C. I. Reactive Violet: 1, 2, 4, 5, 6, 8, 9, 22, 34, 36, and the like. C. I. Disperse Violet: 1, 4, 8, 23, 26, 28, 31, 33, 35, 38, 48, 56, and the like.

[Black Coloring Material]

C. I. Direct Black: 17, 19, 22, 31, 32, 51, 62, 71, 74, 112, 113, 154, 168, 195, and the like. C. I. Acid Black: 2, 48, 51, 52, 110, 115, 156, and the like. C. I. Food Black: 1, 2, and the like. Compounds expressed by the following general formula (6) or their salts.

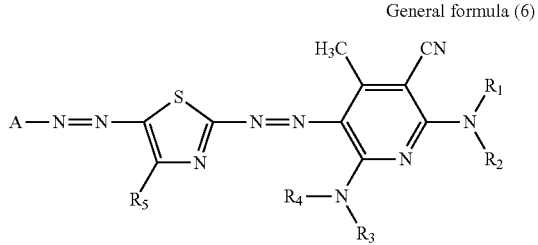

General formula (6)

(in general formula (6), each of $R_1$ and $R_2$ is independently one of a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, and a sulfamoyl group. These groups may further have a substituent, but $R_1$ and $R_2$ are not simultaneously a hydrogen atom. Each of $R_3$ and $R_4$ is independently one of a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, and a sulfamoyl group. $R_3$ and $R_4$ can be one of a hydrogen atom, an aromatic group, a heterocyclic group, an acyl group, and an alkyl- or arylsulfonyl group, among the above. $R_3$ and $R_4$ can be particularly one of a hydrogen atom, an aromatic group, and a heterocyclic group, among the above. $R_5$ is one of an alkyl group, an aromatic group, and a heterocyclic group, and can be an aromatic group among them. A is one of an aromatic group and a heterocyclic group which may be substituted, and can be particularly an aromatic group. Each group described here may further have a substituent. When each group of these has further a substituent, the following is mentioned as the substituent. A hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, an ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group, or a sulfonic acid group, and the like.)

[Brown Coloring Material]

C. I. Reactive Brown: 1, 2, 7, 8, 9, 11, 17, 18, 21, 31, 32, 33, 46, 47, and the like.

(Other Components)

The ink of the present invention may contain a moisturizing compound, such as urea, urea derivatives, trimethylolpropane, and trimethylolethane, other than the components, for moisture retention. The content (% by mass) of the moisturizing compound in the ink can be from 0.1% by mass or more to 20.0% by mass or less, and further from 3.0% by mass or more to 10.0% by mass or less, based on the total mass of the ink.

Further, the ink of the present invention may also contain various compounds as required, other than the components, to provide the ink having the desired property values. Specifically, the ink may contain various additives, for example, a pH controller, an antirust, an antiseptic, a fungicide, an antioxidant, a reduction inhibitor, an evaporation promoter, and a chelator. It is favorable that water-soluble resin is not used in the ink according to the present invention because the water-soluble resin adsorbs the surfactant in the ink so that the effect of the surfactant may be affected.

(Ink Jet Recording Method)

The ink of the present invention can be particularly used in an ink jet recording method in which an ink is ejected by an ink jet recording system to record on a recording medium. The ink jet recording method includes a method in which an ink is ejected by applying mechanical energy to the ink, and a method in which an ink is ejected by applying thermal energy to the ink. Particularly, when the ink of the present invention is used in the ink jet recording method using thermal energy, remarkable effect can be obtained.

(Ink Cartridge)

The ink cartridge of the present invention is characterized by including an ink storage portion for storing the ink of the present invention.

(Recording Unit)

The recording unit of the present invention is characterized by including an ink storage portion for storing the ink of the present invention, and a recording head for ejecting the ink. Particularly, when the recording unit is one in which the recording head ejects the ink by applying thermal energy to the ink, remarkable effect can be obtained.

(Ink Jet Recording Apparatus)

The ink jet recording apparatus of the present invention is characterized by including an ink storage portion for storing the ink of the present invention, and a recording head for ejecting the ink. Particularly, when the ink jet recording apparatus is one in which the recording head ejects the ink by applying thermal energy to the ink, remarkable effect can be obtained.

The schematic configuration of the mechanism portion of an ink jet recording apparatus will be described below. The ink jet recording apparatus includes, from the role of each mechanism, a paper feed portion, a conveyance portion, a carriage portion, a paper discharge portion, a cleaning portion, and an exterior portion for protecting these and having a design property. The outline of these will be described below.

Figure 2:
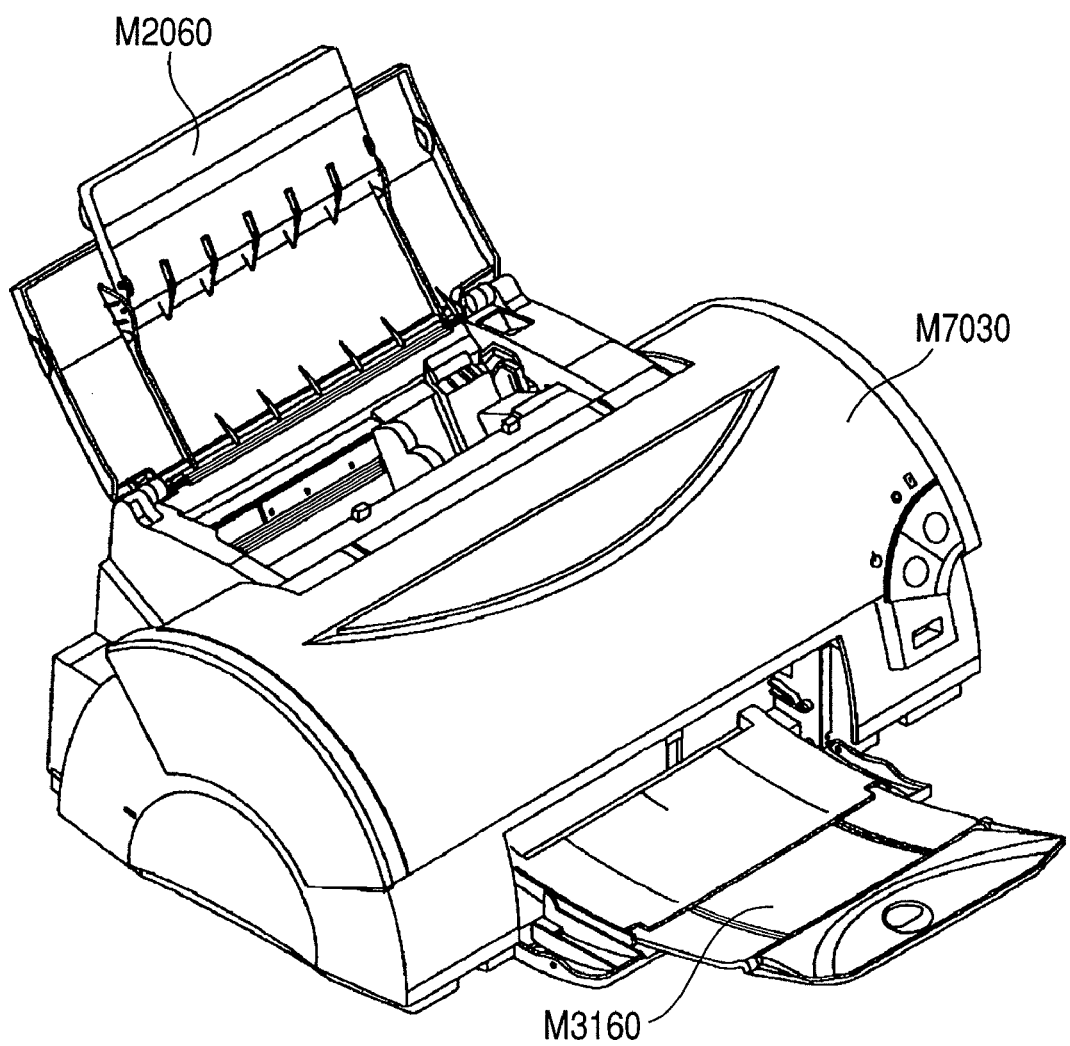
FIG. 2 is a perspective view of an ink jet recording apparatus.
Figure 3:
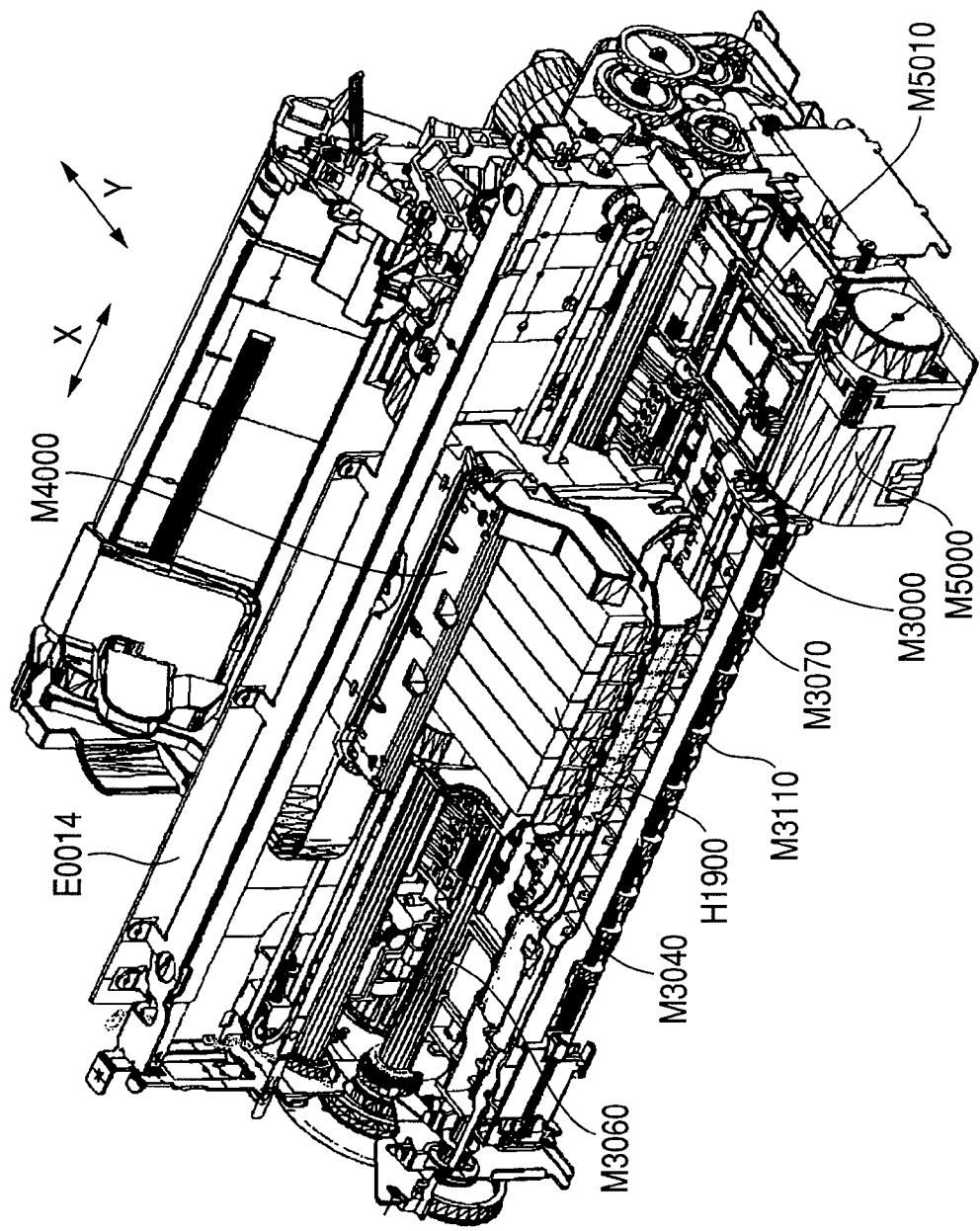
FIG. 3 is a perspective view of the mechanism portion of the ink jet recording apparatus.
Figure 4:
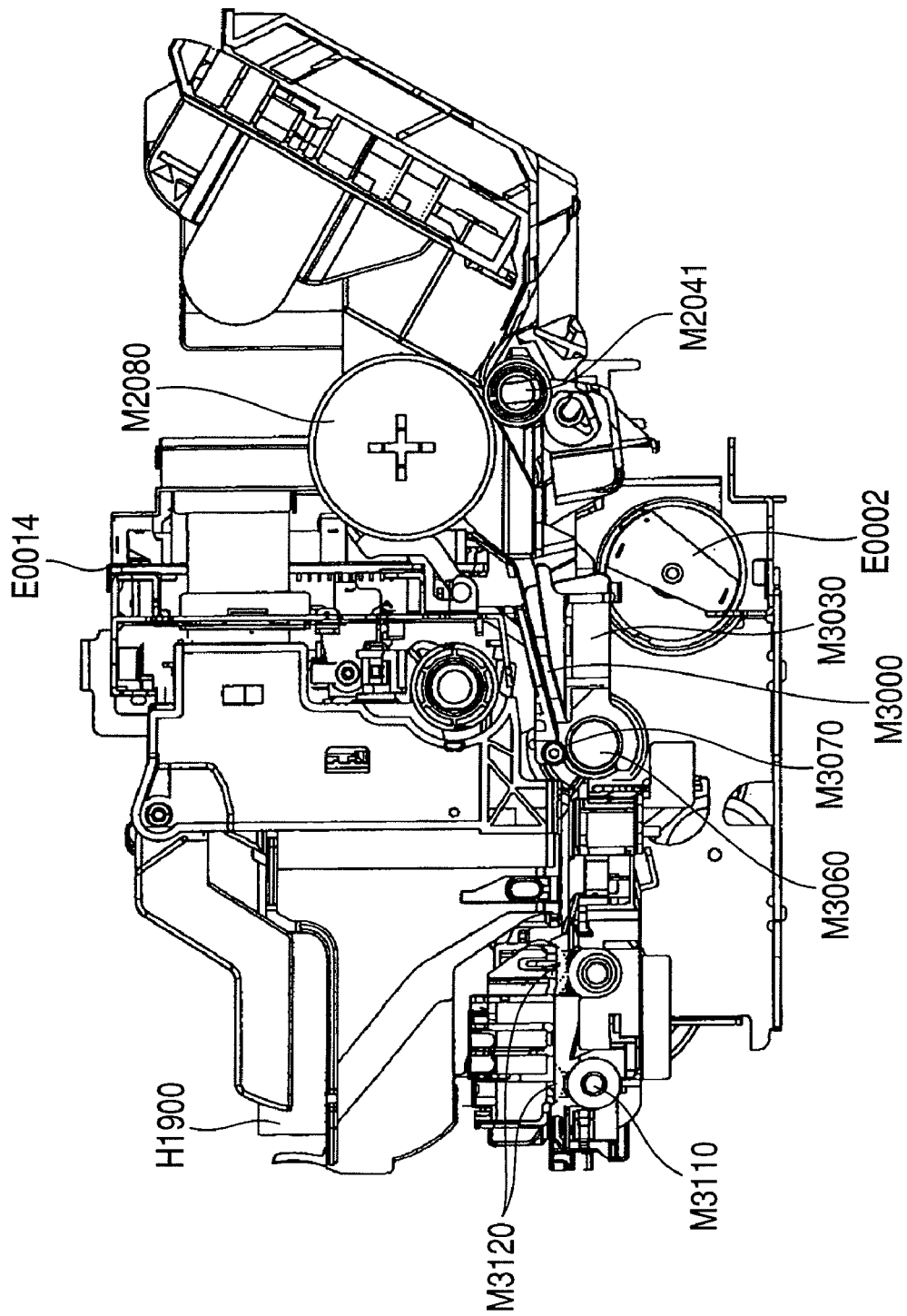
FIG. 4 is a cross-sectional view of the ink jet recording apparatus.

FIG. 2 is a perspective view of an ink jet recording apparatus. FIGS. 3 and 4 are figures for describing the internal mechanism of the ink jet recording apparatus. FIG. 3 illustrates a perspective view from the upper right. FIG. 4 illustrates a cross-sectional side view of the ink jet recording apparatus.

In feeding paper, first, in a paper feed portion including paper feed tray M2060, a predetermined number of recording media are sent to a nip portion including paper feed roller M2080 and separation roller M2041 (see FIGS. 2 and 4). The recording media are separated in the nip portion, and only the top recording medium is conveyed. The recording medium sent to a conveyance portion is guided to pinch roller holder M3000 and paper guide flapper M3030 and sent to a pair of rollers of conveyance roller M3060 and pinch roller M3070. The pair of rollers including conveyance roller M3060 and pinch roller M3070 is rotated by the drive of LF motor E0002. By this rotation, the recording medium is conveyed on platen M3040 (see FIGS. 3 and 4).

In forming an image, a carriage portion locates recording head H1001 (see FIG. 5) at the intended image formation position, and according to a signal from electrical substrate E0014 (see FIG. 3), an ink is ejected on the recording medium. A detailed configuration for recording head H1001 will be described later. By alternately repeating a main scan in which carriage M4000 (see FIG. 3) scans in the column direction while recording head H1001 records, and a secondary scan in which conveyance roller M3060 (see FIGS. 3 and 4) conveys the recording medium in the row direction, an image is formed on the recording medium.

Finally, the recording medium is nipped at the nip of first paper discharge roller M3110 and spur M3120 in a paper discharge portion (see FIG. 4), conveyed, and discharged to paper discharge tray M3160 (see FIG. 2).

An cleaning portion cleans recording head H1001. The cleaning portion sucks the ink and the like from recording head H1001 when pump M5000 (see FIG. 3) is operated with cap M5010 (see FIG. 3) being in close contact with the ejection ports of recording head H1001. The cleaning portion is adapted not to cause the sticking of the ink and other harmful effects when the cleaning portion sucks the ink remaining on cap M5010 with cap M5010 opened.

(Configuration of Recording Head)

Figure 5:
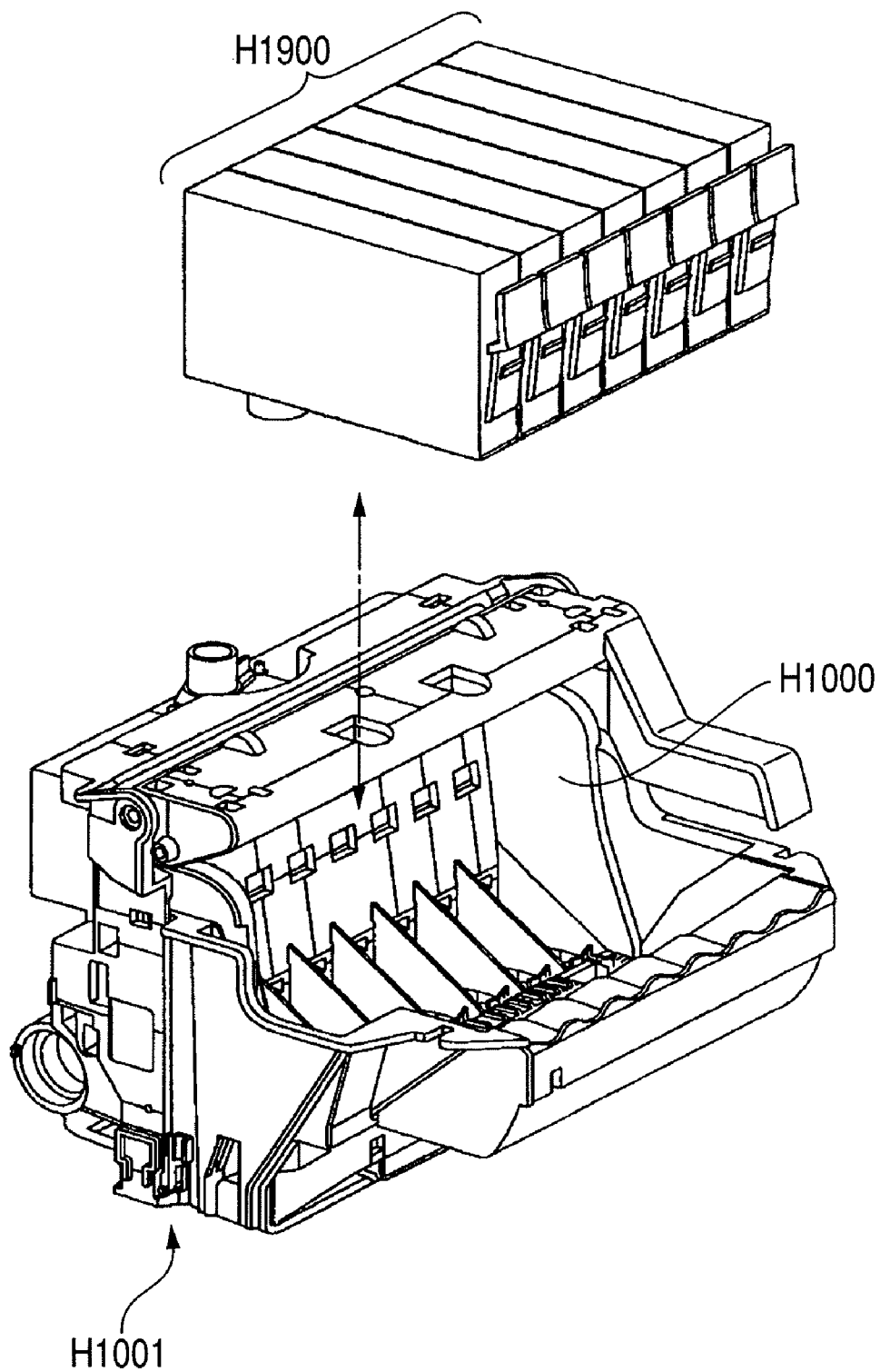
FIG. 5 is a perspective view illustrating a state in which ink cartridges are mounted in a head cartridge.

The configuration of head cartridge H1000 is described (see FIG. 5). Head cartridge H1000 has recording head H1001, a unit for mounting ink cartridges H1900, and a unit for supplying inks from ink cartridges H1900 to the recording head. Head cartridge H1000 is removably mounted in carriage M4000 (see FIG. 3).

FIG. 5 is a figure illustrating a state in which ink cartridges H1900 are mounted in head cartridge H1000. The ink jet recording apparatus forms an image with each ink of, for example, yellow, magenta, cyan, black, light magenta, light cyan, and green. Therefore, ink cartridges H1900 are also independently prepared for seven colors. As illustrated in FIG. 5, respective ink cartridges are removable in head cartridge H1000. Ink cartridges H1900 can be attached and removed, with head cartridge H1000 mounted in carriage M4000 (see FIG. 3).

Figure 6:
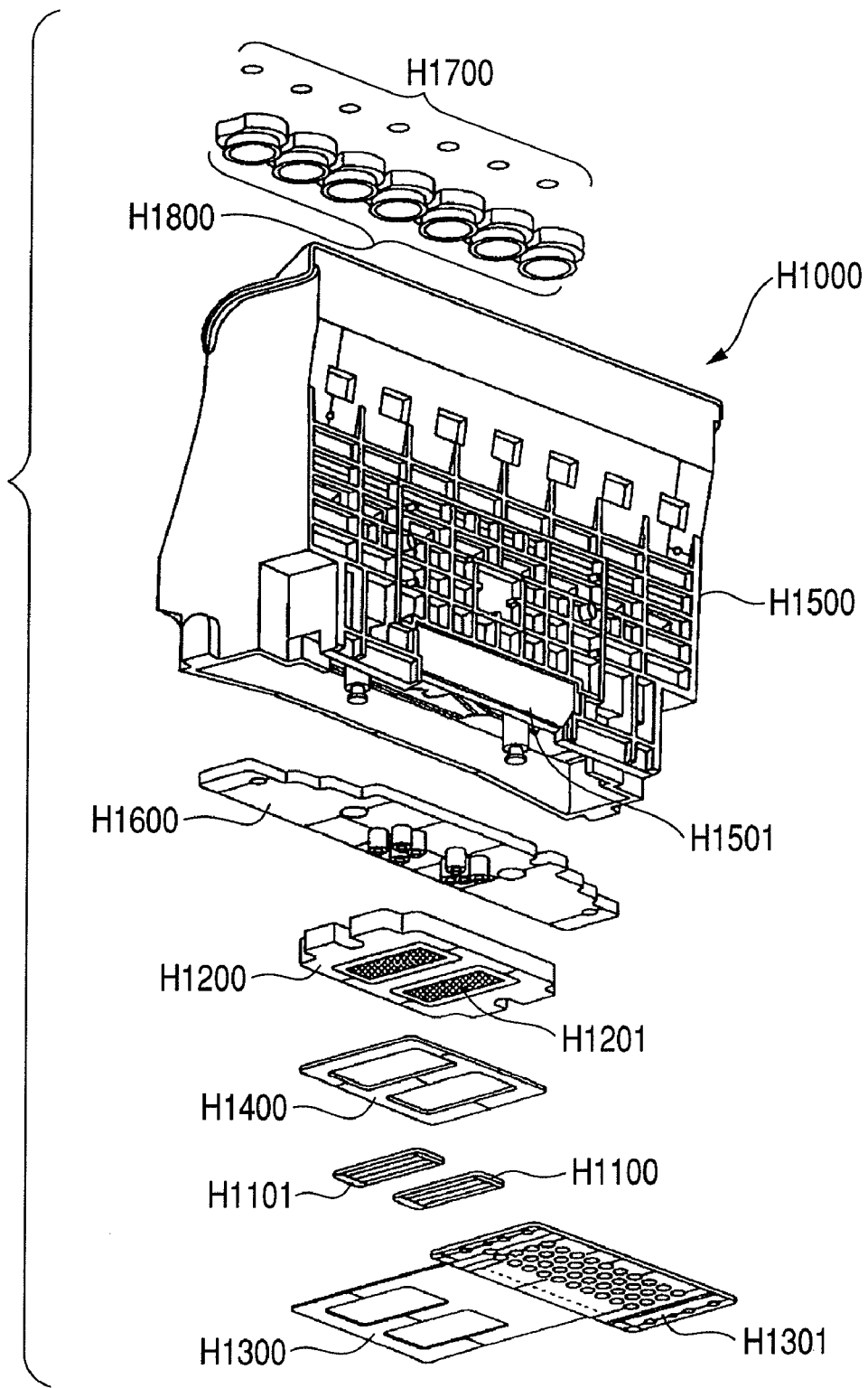
FIG. 6 is an exploded perspective view of the head cartridge.

FIG. 6 is an exploded perspective view of head cartridge H1000. Head cartridge H1000 includes recording element substrates, plates, electrical wiring substrate H1300, cartridge holder H1500, flow path formation member H1600, filters H1700, and seal rubbers H1800. The recording element substrates include first recording element substrate H1100 and second recording element substrate H1101, and the plates include first plate H1200 and second plate H1400.

First recording element substrate H1100 and second recording element substrate H1101 are Si substrates, on one surface of each of which, a plurality of recording elements (nozzles) for ejecting inks are formed by photolithography technology. Electrical wiring of Al or the like for supplying electric power to each recording element is formed by film formation technology, and a plurality of ink flow paths corresponding to individual recording elements are also formed by photolithography technology. Further, ink supply ports for supplying inks to the plurality of ink flow paths are formed to open on the back surface.

Figure 7:
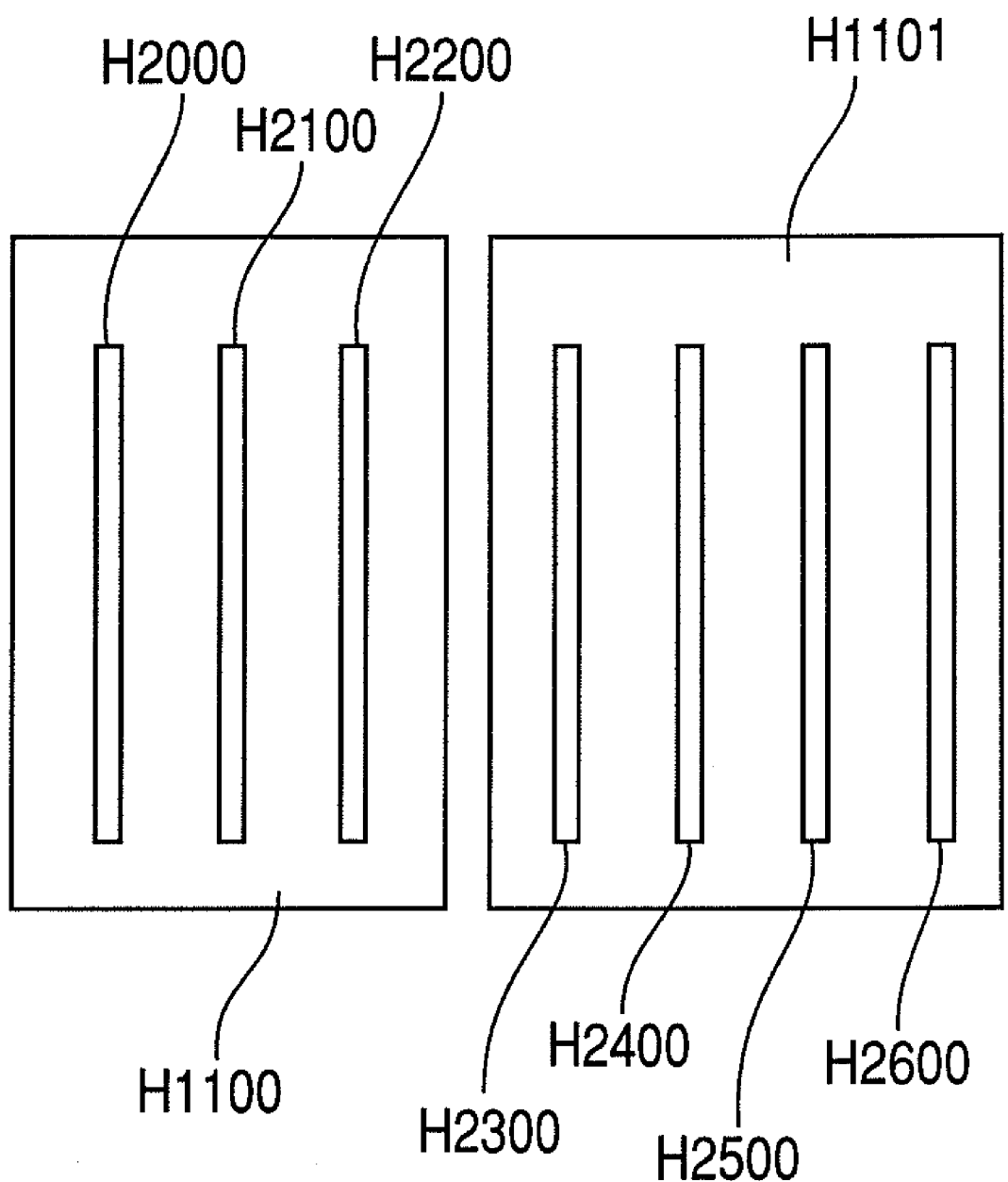
FIG. 7 is a front view illustrating recording element substrates in the head cartridge.

FIG. 7 is an enlarged front view describing the configuration of first recording element substrate H1100 and second recording element substrate H1101. H2000 to H2600 are rows of recording elements (hereinafter also referred to as nozzle rows) for supplying different inks respectively. Nozzle rows for three colors: yellow ink nozzle row H2000, magenta ink nozzle row H2100, and cyan ink nozzle row H2200 are formed on first recording element substrate H1100. Nozzle rows for four colors: light cyan ink nozzle row H2300, black ink nozzle row H2400, green ink nozzle row H2500, and light magenta ink nozzle row H2600 are formed on second recording element substrate H1101.

Each nozzle row includes 768 nozzles arranged in the conveyance direction of the recording medium at an interval of 1,200 dpi (dot/inch, a reference value), and ejects about 2 picoliters of the ink. The opening area of each ejection port is set to about 100 $\mu m^2$. In the present invention, the amount of ejection can be particularly 8 ng or less. If the amount of ejection is more than 8 ng, the area per one dot formed by the ink on the recording medium is large, so that a plurality of dots are easily connected, therefore, gradation may not be sufficiently obtained. The ink of the present invention can be particularly applied to a recording head, in which the resolution of the nozzles of the recording head is 1,200 dpi or more, to obtain more excellent gradation.

Description will be given below, referring to FIGS. 5 and 6. The first recording element substrate H1100 and second recording element substrate H1101 are adhesively fixed to first plate H1200. Here, ink supply ports H1201 for supplying inks to first recording element substrate H1100 and second recording element substrate H1101 are formed. Further, second plate H1400 having openings is adhesively fixed to first plate H1200. This second plate H1400 holds electrical wiring substrate H1300 such that electrical wiring substrate H1300 and first recording element substrate H1100 and second recording element substrate H1101 are electrically connected.

Electrical wiring substrate H1300 applies an electrical signal for ejecting an ink from each nozzle formed on first recording element substrate H1100 and second recording element substrate H1101. This electrical wiring substrate H1300 has electrical wiring corresponding to first recording element substrate H1100 and second recording element substrate H1101, and an external signal input terminal H1301 located at an end of this electrical wiring for receiving an electrical signal from the ink jet recording apparatus. External signal input terminal H1301 is positioned and fixed on the back surface side of cartridge holder H1500.

Flow path formation member H1600 is fixed, for example, by ultrasonic welding, to cartridge holder H1500 for holding ink cartridges H1900 to form ink flow paths H1501 from ink cartridges H1900 to first plate H1200. Filters H1700 are provided at the ink cartridge side ends of ink flow paths H1501 that are engaged with ink cartridges H1900, so that the invasion of dust from the outside can be prevented. Seal rubbers H1800 are mounted on portions engaged with ink cartridges H1900 so that the evaporation of the inks from the engagement portions can be prevented.

Further, a cartridge holder portion and recording head portion H1001 are bonded by adhesion or the like to form head cartridge H1000. The cartridge holder portion includes cartridge holder H1500, flow path formation member H1600, filters H1700, and seal rubbers H1800. Recording head portion H1001 includes first recording element substrate H1100 and second recording element substrate H1101, first plate H1200, electrical wiring substrate H1300, and second plate H1400.

Here, as one form of the recording head, a thermal ink jet system recording head is described, in which recording is performed using an electrothermal converter (a recording element) for generating thermal energy for causing film boiling in the ink according to an electrical signal. For a typical configuration and principle of this, for example, one performing using the basic principle disclosed in U.S. Pat. Nos. 4,723,129, and 4,740,796 is favorable. This system can be applied to any of the so-called on-demand type and continuous type.

The thermal ink jet system is particularly effective for applying to the on-demand type. In the case of the on-demand type, at least one drive signal that corresponds to recording information and provides a rapid temperature increase exceeding nucleate boiling is applied to an electrothermal converter located corresponding to a liquid flow path holding an ink. This generates thermal energy in the electrothermal converter and causes film boiling in the ink. As a result, a bubble in the ink in one-to-one correspondence with this drive signal can be formed. The ink is ejected through an ejection port by the growth and shrinkage of this bubble to form at least one drop. The drive signal is more favorably in a pulse shape because the growth and shrinkage of the bubble are suitably performed instantly so that the ejection of the ink particularly with excellent responsiveness can be achieved.

The ink of the present invention is not limited to the thermal ink jet system and can also be favorably used in an ink jet recording apparatus using mechanical energy as described below. The ink jet recording apparatus in such a form includes a nozzle formation substrate having a plurality of nozzles, a pressure generation element of piezoelectric material and electrically conductive material located opposed to the nozzles, and an ink filling around this pressure generation element. The pressure generation element is displaced by applied voltage to eject the ink from the nozzles.

The ink jet recording apparatus is not limited to one in which the recording head and the ink cartridge are separate, and one in which the recording head and the ink cartridge are integrated inseparably may be used. Further, the ink cartridge may be one integrated separably or inseparably with the recording head to be mounted in the carriage. The ink cartridge may be one provided in the fixing site of the ink jet recording apparatus to supply the ink to the recording head through the ink supply member, such as a tube. When a configuration for applying favorable negative pressure to the recording head is provided in the ink cartridge, the following configuration can be provided. In other words, a form in which an absorber is located in the ink storage portion of the ink cartridge, a form having a flexible ink storage bag and a spring portion for applying to this bag biasing force in the direction of expanding the internal volume of the bag, or the like can be provided. The ink jet recording apparatus can be one adopting a serial type recording system, but the ink jet recording apparatus may be one in the form of a line printer in which recording elements are aligned over the range corresponding to the full width of the recording medium.

EXAMPLES

Next, the present invention will be described more specifically by way of examples, comparative examples, and reference examples. The present invention is not limited to the following examples, unless beyond the substance thereof. In the text, "part" and "%" are by mass, unless otherwise specified.

(HLB Value and Structure of Surfactants)

The HLB value of surfactants was obtained. Specifically, for the main component of each surfactant, the HLB value was calculated using the Griffin method (the following formula (1)). The result is shown in Table 1.

$$HLB = 20 \times (\text{the formula weight of the hydrophilic group of the surfactant})/(\text{the molecular weight of the surfactant}) \quad (1)$$

The structure of the main component of each surfactant, and also the value of m, n, a, and m+n, or the value of x, y, b, and x+y, when the structure of such a surfactant applies to general formula (1) or general formula (2), are shown in Table 1. In Table 1, Acetylenol E100 is a surfactant manufactured by Kawaken Fine Chemicals. EMULMIN NL70, NL90, CC-100, and C0-50 are surfactants manufactured by Sanyo Chemical Industries. NIKKOL BT-7 is a surfactant manufactured by Nikko Chemicals. EMALEX 1610, 1625, and 1810 are surfactants manufactured by Nihon Emulsion. For polyoxyethylene nonylphenyl ether, one in which the number of moles of the added ethylene oxide group was 5 and which was synthesized according to a normal method was used.

TABLE 1

| | HLB Value | Structure of surfactant | General formula (1) | | | | General formula (2) | | | |
|---|---|---|---|---|---|---|---|---|---|---|
| | | | m | n | a | m+n | x | y | b | x+y |
| Acetylenol E100 | 13.3 | Acetylene glycol ethylene oxide adduct | — | — | — | — | — | — | — | — |
| EMULMIN NL70 | 12.5 | Polyoxyethylene lauryl ether | — | — | — | — | — | — | — | — |
| EMULMIN NL90 | 13.6 | Polyoxyethylene lauryl ether | — | — | — | — | — | — | — | — |
| EMULMIN CC-100 | 12.9 | Polyoxyethylene cetyl ether | — | — | — | — | — | — | — | — |
| EMULMIN CC-50 | 9.0 | Polyoxyethylene oleyl ether | — | — | — | — | — | — | — | — |
| NIKKOL BT-7 | 12.2 | Polyoxyethylene secondary tridecyl ether | — | — | — | — | 6 | 6 | 7 | 12 |
| EMALEX 1610 | 12.9 | Polyoxyethylene isocetyl ether | 8 | 6 | 10 | 14 | — | — | — | — |
| EMALEX 1625 | 16.4 | Polyoxyethylene isocetyl ether | 8 | 6 | 25 | 14 | — | — | — | — |
| EMALEX 1810 | 12.4 | Polyoxyethylene isostearyl ether | 9 | 7 | 10 | 16 | — | — | — | — |
| Polyoxyethylene nonylphenyl Ether | 10.0 | Polyoxyethylene nonylphenyl ether | — | — | — | — | — | — | — | — |

(Preparation of Inks)

The components shown in Table 2 and Table 3 were mixed and sufficiently stirred, then, pressure filtered by a microfilter having a pore size of 0.2 μm (manufactured by Advantec Co., Ltd.) to prepare the inks of Examples 1 to 10 and Comparative Examples 1 to 11. In Table 2 and Table 3, Acetylenol E100 is a surfactant manufactured by Kawaken Fine Chemicals. EMULMIN NL70, NL90, CC-100, and C0-50 are surfactants manufactured by Sanyo Chemical Industries. NIKKOL BT-7 is a surfactant manufactured by Nikko Chemicals. EMALEX 1610, 1625, and 1810 are surfactants manufactured by Nihon Emulsion. For polyoxyethylene nonylphenyl ether, one in which the number of moles of the added ethylene oxide group was 5 and which was synthesized according to a normal method was used.

TABLE 2

(Unit: %)

| | Example | | | | | | | | | |
|---|---|---|---|---|---|---|---|---|---|---|
| | 1 | 2 | 3 | 4 | 5 | 6 | 7 | 8 | 9 | 10 |
| C.I. Direct Blue 199 | 6.0 | 6.0 | 6.0 | 6.0 | 6.0 | 6.0 | 6.0 | 6.0 | 6.0 | 6.0 |
| Glycerin | 5.0 | 10.0 | 10.0 | 5.0 | 5.0 | 10.0 | 10.0 | 10.0 | 10.0 | 5.0 |
| Diethylene glycol | 5.0 | 7.0 | 7.0 | 5.0 | 5.0 | 7.0 | 7.0 | 7.0 | 7.0 | |
| Ethylene glycol | | | | | | | | | | |
| Triethanolamine | | | | | | | | | | |
| 1,5-Pentanediol | 10.0 | 3.0 | 3.0 | 10.0 | 10.0 | 3.0 | 3.0 | 3.0 | 3.0 | 16.0 |
| 1,2-Hexanediol | 0.5 | | | 0.5 | 0.5 | | | | | |
| Acetylenol E100 | | | | | | | | | | |
| EMULMIN NL70 | | | | | | | | | | |
| EMULMIN NL90 | | 0.2 | | | | | | | | |
| EMULMIN CC-100 | | | | | | | | | | |
| EMULMIN CO-50 | 2.1 | | | | | | | | | |
| NIKKOL BT-7 | | | 0.2 | | | | | | | |
| EMALEX 1610 | | | | | | 0.2 | 0.3 | 1.0 | | |
| EMALEX 1625 | | | | | | | | | 1.0 | |
| EMALEX 1810 | | | | 2.1 | 2.0 | | | | | 2.0 |
| Polyoxyethylene nonylphenyl Ether | | | | | | | | | | |
| Ion-exchange water | 71.4 | 73.8 | 73.8 | 71.4 | 71.5 | 73.8 | 73.7 | 73.0 | 73.0 | 71.0 |

TABLE 3

(Unit: %)

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| C.I. Direct Blue 199 | 6.0 | 6.0 | 6.0 | 6.0 | 6.0 | 6.0 | 6.0 | 6.0 | 5.0 | 6.0 | 6.0 |
| Glycerin | 10.0 | 10.0 | 10.0 | 10.0 | 10.0 | 10.0 | 10.0 | 10.0 | 10.0 | 10.0 | 10.0 |
| Diethylene Glycol | 10.0 | 10.0 | 8.5 | 7.0 | 6.0 | 6.0 | | 7.0 | | 8.0 | |
| Ethylene Glycol | | | | | | | | | 10.0 | | |
| Triethanolamine | | | | | | | | | 0.5 | | |
| 1,5-Pentanediol | | | | 3.0 | 4.0 | 4.0 | 10.0 | 3.0 | | 2.0 | 10.0 |
| 1,2-Hexanediol | | | 1.5 | | | | 0.5 | | | | 1.5 |
| Acetylenol E100 | | | | | | 0.1 | 1.0 | | | | 1.0 |
| EMULMIN NL70 | 0.2 | 0.4 | 0.2 | 0.1 | 0.2 | | | 0.4 | | | |
| EMULMIN NL90 | | | | | | | | | | 0.2 | |
| EMULMIN CC-100 | | | | 0.8 | | | | 0.4 | | | |
| EMULMIN CO-50 | | | | | | | | | | | |
| NIKKOL BT-7 | | | | | | | | | | | |
| EMALEX 1610 | | | | | | | | | | | |
| EMALEX 1625 | | | | | | | | | | | |
| EMALEX 1810 | | | | | | | | | | | |
| Polyoxyethylene nonylphenyl Ether | | | | | | | | | 0.5 | | |
| Ion-exchange water | 73.8 | 73.6 | 73.8 | 73.1 | 73.8 | 73.9 | 72.5 | 73.2 | 74.0 | 73.8 | 71.5 |

(Evaluation)

(Measurement of Static Surface Tension of Aqueous Media)

Aqueous media having composition in which the coloring material and surfactant were excluded from the ink composition of Examples 1 to 10 and Comparative Examples 1 to 11 shown in the above Table 2 and Table 3, that is, aqueous media including only water and at least one water-soluble organic compound(s) were prepared respectively. The static surface tension of each aqueous medium obtained was measured using a surface tension measurement apparatus (automatic surface tensiometer CBVP-Z type, manufactured by Kyowa Interface Science) for measuring surface tension by a plate method using a platinum plate. The static surface tension was measured at 25° C. The measurement result is shown in Table 4.

(Measurement of Dynamic Surface Tension)

For each ink obtained above, the dynamic surface tension of the ink at (1) a lifetime of 50 milliseconds and (2) a lifetime of 500 milliseconds was measured. Also, a difference in dynamic surface tension between at (1) and (2) $\Delta\gamma[(1)-(2)]$ was obtained. For measurement, an apparatus for measuring dynamic surface tension by a maximum bubble pressure method (Bubble Pressure Tesiometer BP2, manufactured by A. KRUSS Optronic GmbH) was used. The dynamic surface tension was measured at 25° C. The dynamic surface tension measurement result is shown in Table 4.

(Making of Recorded Matter)

An ink cartridge was filled with each ink obtained above and mounted in modified one of an ink jet recording apparatus iP5200R (manufactured by Canon) that ejects an ink from the recording head by the action of thermal energy. Then, 2.5 cm×2.5 cm images, with the recording duty changed from 10% to 100% at an interval of 10%, were recorded on the following recording media. In the present invention, the recording duty when the amount of the applied ink per 600 dpi is 10 ng is 100%. The resolution of the recording head used was 1,200 dpi (dot/inch), and the amount of ejection per dot was 5.0 ng within ±5%.

In the printer driver, default mode was selected.
paper type: plain paper
print quality: standard
color adjustment: automatic For recording medium, the following three types of plain paper were used.

PPC paper Office Planner (manufactured by Canon)
PPC paper Canon Extra (manufactured by Canon)
PPC paper HP Bright White inkjet paper (manufactured by Hewlett-Packard).

(Evaluation of Gradation)

After the obtained recorded matters were left for one day, the image density (OD value) at each recording duty was measured using a reflection densitometer (trade name: Macbeth RD-918, manufactured by Macbeth). The image density at each recording duty was a value obtained by averaging the values of image density in the above three recording media. Then, a value ($OD_{50}/OD_{100}$) in which the value of the image density of an image with a recording duty of 50% (defined as $OD_{50}$) was divided by the value of the image density of an image with a recording duty of 100% (defined as $OD_{100}$) was obtained to evaluate gradation. Here, it can be said that as the relationship between the recording duty and the image density is closer to directly proportional relationship, the image has more excellent gradation. In the above evaluation method, a value in which the image density of an image with a recording duty of 50% was divided by the image density of an image with a recording duty of 100% was obtained. Therefore, as the obtained value is closer to 50(%)/100(%)=0.5, the gradation is more excellent. The evaluation standard for gradation is as follows. The evaluation result is shown in Table 4.

AA: The value in which the image density at a recording duty of 50% is divided by the image density at a recording duty of 100% is from 0.5 or more to less than 0.7, and the gradation is particularly excellent.

A: The value in which the image density at a recording duty of 50% is divided by the image density at a recording duty of 100% is from 0.7 or more to less than 0.8, and the gradation is excellent.

B: The value in which the image density at a recording duty of 50% is divided by the image density at a recording duty of 100% is from 0.8 or more to less than 0.85, and the gradation is somewhat poor.

C: The value in which the image density at a recording duty of 50% is divided by the image density at a recording duty of 100% is from 0.85 or more, and the gradation is poor.

(Evaluation of Color Uniformity)

After the obtained recorded matters were left for one day, an image with a recording duty of 100% was visually checked to evaluate color uniformity. For the evaluation of color uniformity, an image formed on PPC paper HP Bright White inkjet paper (manufactured by Hewlett-Packard), which provides the most conspicuous color irregularity among the three recording media evaluated, was used. The evaluation standard for color uniformity is as follows. The evaluation result is shown in Table 4.

AA: The color of the image is uniform.
A: The image has only slight color irregularity, but almost unnoticeable.
B: The image has color irregularity, but at an acceptable level.
C: The image has remarkable color shade.

(Evaluation of Ejection Stability and Re-Ejection Property After Recording Pause)

An ink cartridge was filled with each ink obtained above and mounted in modified one of an ink jet recording apparatus iP5200R (manufactured by Canon) that ejects an ink from the recording head by the action of thermal energy. Then, without pre-ejection, an ink was ejected from a nozzle in an environment of a temperature of 15° C. and a humidity of 10%. Then, the ink was left without being ejected from the nozzle for 30 seconds and without capping. Then, further, the ink was ejected from the same nozzle to record an image. At this time, high-grade paper (HR-101, manufactured by Canon) was used as the recording medium, and a 2.5 cm×2.5 cm image with a recording duty of 100% was recorded. The resolution of the recording head used was 1,200 dpi (dot/inch), and the amount of ejection per dot was 5.0 ng within ±5%. The obtained image was visually checked to evaluate ejection stability. The evaluation standard for ejection stability is as follows. The evaluation result is shown in Table 4.

A: Recording can be normally performed.
B: There are recording fluctuations to some degree, but at an acceptable level.

TABLE 4

| | | Static surface tension of aqueous medium [mN/m] | Dynamic surface tension of ink [mN/m] | | | Evaluation result | | |
| --- | --- | --- | --- | --- | --- | --- | --- | --- |
| | | | (1) Lifetime of 50 milliseconds | (2) Lifetime of 500 milliseconds | $\Delta\gamma$ [(1) − (2)] | Gradation | Color uniformity | Ejection stability |
| Example | 1 | 47 | 45 | 38 | 7 | A | B | B |
| | 2 | 57 | 42 | 35 | 7 | A | B | A |
| | 3 | 57 | 42 | 33 | 9 | A | A | A |
| | 4 | 47 | 44 | 35 | 9 | A | AA | B |
| | 5 | 47 | 45 | 35 | 10 | AA | AA | A |
| | 6 | 57 | 48 | 38 | 10 | AA | A | A |
| | 7 | 57 | 47 | 37 | 10 | AA | AA | A |
| | 8 | 57 | 45 | 35 | 10 | AA | AA | A |
| | 9 | 57 | 45 | 37 | 8 | A | AA | A |
| | 10 | 45 | 42 | 32 | 10 | AA | AA | A |
| Comp. Example | 1 | 61 | 44 | 35 | 9 | B | B | A |
| | 2 | 61 | 41 | 34 | 7 | C | B | A |
| | 3 | 44 | 38 | 33 | 5 | C | B | A |
| | 4 | 57 | 49 | 41 | 8 | B | C | A |
| | 5 | 56 | 41 | 34 | 7 | B | B | A |

TABLE 4-continued

| | | Dynamic surface tension of ink [mN/m] | | | Evaluation result | | |
|---|---|---|---|---|---|---|---|
| | Static surface tension of aqueous medium [mN/m] | (1) Lifetime of 50 milliseconds | (2) Lifetime of 500 milliseconds | Δγ [(1) − (2)] | Gradation | Color uniformity | Ejection stability |
| 6 | 56 | 42 | 39 | 3 | B | C | A |
| 7 | 45 | 30 | 28 | 2 | C | A | A |
| 8 | 57 | 42 | 36 | 6 | B | B | A |
| 9 | 63 | 39 | 32 | 7 | C | B | A |
| 10 | 58 | 43 | 36 | 7 | B | B | A |
| 11 | 43 | 29 | 27 | 2 | C | A | A |

When the back surface of a portion of an image formed on the recording medium using the ink of Comparative Example 11 was visually checked, strike-through had occurred. On the other hand, strike-through had not occur on the back surface of a portion of an image formed on the recording medium using inks other than the ink of the above Comparative Example 11.

Inks in which the content of the surfactant in the ink was in a range of 0.1% by mass to 2.0% by mass were prepared using commercially available various fluorine surfactants and silicone surfactants. However, even if the content of these surfactants was in the above range, an ink that satisfies the dynamic surface tension property of the ink defined by the present invention could not be obtained. Evaluation similar to the above was performed using these inks, and only images having poor gradation and color uniformity were obtained with any of the inks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-126632, filed May 11, 2007 and 2008-112759, filed Apr. 23, 2008, which are hereby incorporated by reference in their entirety.

The invention claimed is:

1. An aqueous ink comprising at least an aqueous medium, a surfactant, and a dye, wherein the aqueous medium comprises only water and at least one water-soluble organic compound, a static surface tension of the aqueous medium is from 45 mN/m or more to 57 mN/m or less, and a dynamic surface tension of the aqueous ink satisfies the following conditions (1), (2), and (3):

(1) the dynamic surface tension of the aqueous ink at a lifetime of 50 milliseconds is from 42 mN/m or more to less than 49 mN/m, (2) the dynamic surface tension of the aqueous ink at a lifetime of 500 milliseconds is from 28 mN/m or more to 38 mN/m or less, and (3) a difference between the dynamic surface tension of the aqueous ink at a lifetime of 50 milliseconds and the dynamic surface tension of the aqueous ink at a lifetime of 500 milliseconds is 7 mN/m or more.

2. The aqueous ink according to claim 1, wherein the surfactant comprises at least one selected from a surfactant represented by the following general formula (1) and a surfactant represented by general formula (2):

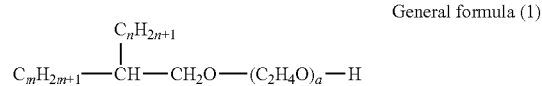

General formula (1)

$$C_mH_{2m+1}-\underset{\underset{C_nH_{2n+1}}{|}}{CH}-CH_2O-(C_2H_4O)_a-H$$

wherein m, n, and a each independently represent an integer of 1 or more, and m+n represents an integer of 14 to 20,

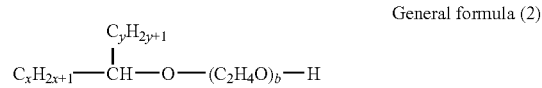

General formula (2)

$$C_xH_{2x+1}-\underset{\underset{C_yH_{2y+1}}{|}}{CH}-O-(C_2H_4O)_b-H$$

wherein x, y, and b each independently represent an integer of 1 or more, and x+y represents an integer of 12 to 21.

3. The aqueous ink according to claim 1, wherein a content (% by mass) of the surfactant in the aqueous ink is from 0.30% by mass or more to 2.0% by mass or less, based on a total mass of the aqueous ink.

4. The aqueous ink according to claim 1, wherein a HLB value of the surfactant by a Griffin method is from 12.0 or more to 16.5 or less.

5. An ink jet recording method in which an ink is ejected by an ink jet method, wherein the ink is the aqueous ink according to claim 1.

6. The ink jet recording method according to claim 5, wherein the ink jet method is an ink jet recording method in which an ink is ejected from a recording head by action of thermal energy.

7. An ink cartridge comprising an ink storage portion for storing an ink, wherein the ink stored in the ink storage portion is the aqueous ink according to claim 1.

8. A recording unit comprising an ink storage portion for storing an ink, and a recording head for ejecting an ink, wherein the ink stored in the ink storage portion is the aqueous ink according to claim 1.

9. An ink jet recording apparatus comprising an ink storage portion for storing an ink, and a recording head for ejecting an ink, wherein the ink stored in the ink storage portion is the aqueous ink according to claim 1.

* * * * *